US010120560B2

(12) United States Patent
Wild et al.

(10) Patent No.: US 10,120,560 B2
(45) Date of Patent: Nov. 6, 2018

(54) USER INTERFACE AND METHOD FOR ASSISTING A USER WHEN OPERATING AN OPERATING UNIT

(71) Applicant: VOLKSWAGEN AKTIENGESELLSCHAFT, Wolfsburg (DE)

(72) Inventors: Holger Wild, Berlin (DE); Mark Peter Czelnik, Wolfsburg (DE); Gordon Seitz, Ehra-Lessien (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 254 days.

(21) Appl. No.: 15/025,522

(22) PCT Filed: Sep. 27, 2013

(86) PCT No.: PCT/EP2013/070217
§ 371 (c)(1),
(2) Date: Mar. 31, 2016

(87) PCT Pub. No.: WO2015/043655
PCT Pub. Date: Apr. 2, 2015

(65) Prior Publication Data

US 2016/0210015 A1 Jul. 21, 2016

(51) Int. Cl.
*G06F 3/048* (2013.01)
*G06F 3/0488* (2013.01)
(Continued)

(52) U.S. Cl.
CPC .......... *G06F 3/0488* (2013.01); *G06F 3/0416* (2013.01); *G06F 3/167* (2013.01);
(Continued)

(58) Field of Classification Search
CPC ........ G06F 3/011; G06F 3/016; G06F 3/0167; G06F 3/017; G06F 2203/04808; G06F 3/041
See application file for complete search history.

(56) References Cited

U.S. PATENT DOCUMENTS 8,887,043 B1 * 11/2014 Pollack ................ G06F 3/0304 345/108
2006/0022955 A1 2/2006 Kennedy
(Continued)

FOREIGN PATENT DOCUMENTS

DE 102007039450 A1 2/2009
KR 20120067334 6/2012
WO 20009/062677 A2 5/2009

OTHER PUBLICATIONS

Korean Patent Appln. No. KR-10-2012-7010256. Applicant: Volkswagen AG. Office Action (Feb. 13, 2017).
(Continued)

*Primary Examiner* — Claudia Dragoescu
(74) *Attorney, Agent, or Firm* — Loza & Loza, LLP; Peter Zura

(57) ABSTRACT

Systems, apparatuses and methods for assisting a user in the operation of a touch-sensitive operator control unit, where a presence of input means, such as a user's finger, is detected in a predefined first area in front of the operator control unit, and, in response to it, acknowledging of the detected presence by a predefined first audio output. The first area may be bounded in a direction parallel to a surface of the operator control unit corresponding to a button displayed on the operator control unit. The crossover of the input means from the first area into a predefined second area in front of the operator's control unit may also be detected and acknowledged by a predefined second audio output. Also, a predefined pattern of movement of the input means in the first
(Continued)

10 4 20 1
Hopfengarten 16:57 TP
twinkler Damm
Portishead Dummy
Wandering Star
Emmy-Noether Weg
Braunschweig
-5 °C
Moderate Snow
Share Setup
2 P1 30 2 area may be detected and acknowledged via audio or visual indicia.

16 Claims, 3 Drawing Sheets

(51) Int. Cl.
*G06F 3/16* (2006.01)
*G06F 3/041* (2006.01)

(52) U.S. Cl.
CPC .............. *G06F 2203/04101* (2013.01); *G06F 2203/04108* (2013.01)

(56) References Cited

U.S. PATENT DOCUMENTS

2007/0146341 A1* 6/2007 Medler ............... G06F 3/04847 345/173
2009/0225043 A1 9/2009 Rosener
2012/0268404 A1* 10/2012 Kuhn ..................... B60K 35/00 345/173

OTHER PUBLICATIONS

International Search Report and Written Opinion for PCT/EP13/70217 dated May 16, 2014; 11 pages.

* cited by examiner

USER INTERFACE AND METHOD FOR ASSISTING A USER WHEN OPERATING AN OPERATING UNIT

RELATED APPLICATIONS

The present application claims priority to International Pat. App. No. PCT/EP2013/070217, titled "User Interface and Method for Assisting a User When Operating an Operating Unit," to Wild et al, filed Sep. 27, 2013, the contents of which is incorporated by reference in its entirety herein.

BACKGROUND

The present disclosure relates to a user interface and to a process to assist a user in the movement of a touch-sensitive operator control unit. The present disclosure also relates to the assistance of a driver of a vehicle during the operation of a vehicle-based operator control unit while driving the vehicle.

The prior art describes operating systems for operator control units that use display contents in which information/contact units (also called "buttons" or "tiles") are displayed next to one another to launch an associated function. These tiles can occasionally be rearranged in relation to one other in response to a request from a user. Examples of generic operating systems are Windows 8™ as well as the Samsung Galaxy S4's™ Airview™. In addition, it is also conventional (e.g. when using an Internet browser) to acknowledge mouse clicks with an acoustic acknowledgment tone ("click"). In addition to key-based input units, "touch screens" (touch-sensitive displays) have also become common for the operation of operator control units of vehicles and smartphones.

WO 2009/062677 A2 discloses a multimodal user interface of a driver information system for the input and presentation of information in which the presence of one of user's fingers in an area in front of a predefined screen area results in the triggering of a function of the user interface. In this case, without the user being in contact with the operator control unit, the presence of the finger is detected and associated with a specific screen content, so that a context-specific function is launched by this operating step, which is also called "hovering".

In particular during the discharge of the driving tasks by the user and on an uneven roadway, however, entry by hovering takes some getting used to, because the user's vision is directed primarily toward the road and the unevenness of the roadway can lead to unintentional relative movements between the user's hand and the operator control unit.

There is a need in the art to assist a user during hovering in front of an operator control unit.

BRIEF SUMMARY

In certain illustrative embodiments, various processes are disclosed to assist a user in the operation of a touch-sensitive operator control unit, comprising the steps of detecting of a presence of input means, such as a user's finger, in a predefined first area in front of the operator control unit, and, in response to it, acknowledging of the detected presence by a predefined first audio output. In other illustrative embodiments, the predefined first area is a distance from the operator's control unit that is greater than 0 mm, or greater than 1 mm and preferably greater than 2 mm. The first area may be bounded in a direction parallel to a surface of the operator control unit corresponding to a button displayed on the operator control unit. Certain illustrative embodiments may detect the crossover of the input means from the first area into a predefined second area in front of the operator's control unit and acknowledge the detected crossover by a predefined second audio output. Also, processes may detect a predefined pattern of movement of the input means in the first area, and in response to it, acknowledge the predefined pattern of movement by a third audio output associated with the predefined pattern of movement. The detected presence by a predefined alternative visual display of a button displayed on the operator control unit may also be acknowledged.

In certain illustrative embodiments, a user interface is disclosed, such as a Human Machine Interface installed in a motor vehicle, the interface comprising a touch-sensitive operator control unit; a detection device for the detection of a user input, and processing device, wherein the user interface is designed to carry out a process according to the present disclosure. The operator control unit may be located centrally in the dashboard of a motor vehicle, and the detection device may include a camera system and/or a capacitive sensor.

In addition, the user interface according to the present disclosure may comprise a storage apparatus in which, for example, references are stored for the detection of predefined patterns of movement, which can be called up and used by the processing device in the performance of the process according to the present disclosure.

BRIEF DESCRIPTION OF THE DRAWINGS

Exemplary embodiments of the invention are described in greater detail below, with reference to the accompanying drawings, in which.

DETAILED DESCRIPTION

Figure 1:
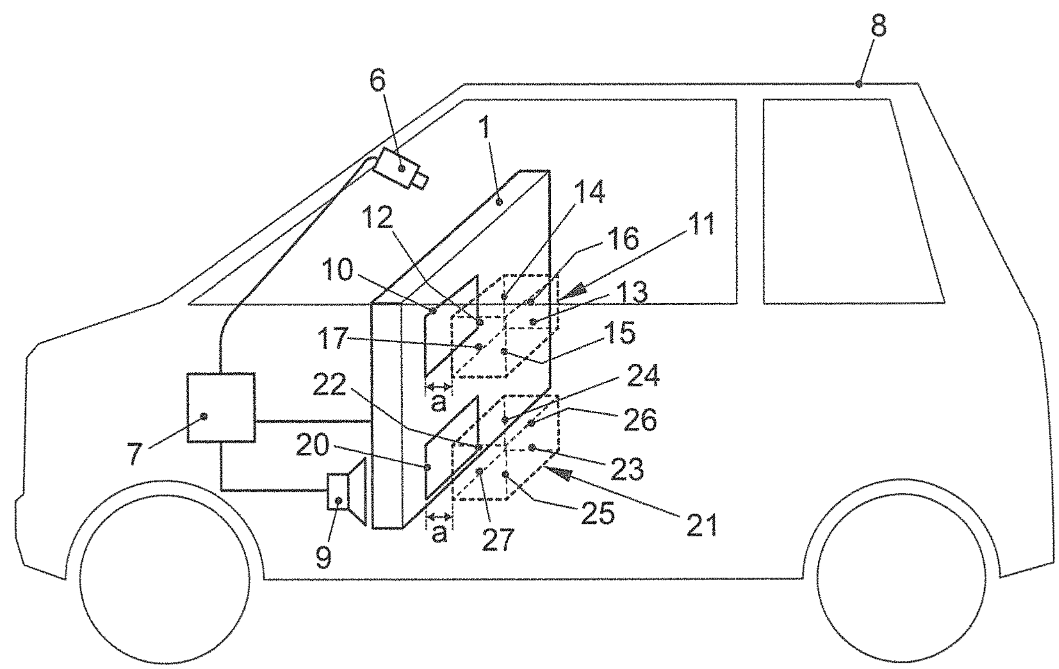
FIG. 1 is a schematic overview of components of a user interface according to an illustrative embodiment.

Various embodiments disclosed herein show systems, apparatuses and methods for assisting a user in the operation of a touch-sensitive operator control unit and includes a detection of a presence of an input means in a predefined first area in front of the operator control unit. The input means can be, for example, the finger of a user, a stylus etc. In the context of the present disclosure, the phrase "in front of the operator control unit", in contrast to the phrase "on the operator control unit" means an area that is not in contact with a surface of the operator control unit. If the presence of the input means is detected in this first area, the operating step can be referred to herein as "hovering".

According to the present disclosure, a first predefined audio output is output as an acknowledgment in response to the detection of the presence of the input means. In other words, when hovering is detected, an audio signal, reproduced via an acoustic signal transformer, is output to indicate to the user that the input means have reached the first predefined area in front of the operator control unit. Hovering therefore generates an additional input capability that reduces contact with the operator control and in turn reduces screen contamination, such as dirt, fingerprints, etc. The acknowledgment tone thereby gives the user feedback that the input means are in the detection area of the operator control unit. In this manner the user can keep his or her eyes on the road, which contributes to increasing the safety of travel.

In order of preference, the predefined first area is at a distance from the operator control unit may be greater than 0 mm, greater than 1 mm or even greater than 2 mm. In other words, an input associated with hovering is executed only if the input means do not physically touch the operator control unit. This clearly distinguishes touch inputs ("touch process") from hovering as disclosed herein.

A first area can be at a distance between 0 mm and a predefined maximum distance perpendicular to the surface of the operator control unit, and parallel to the surface of the operator control unit, corresponding to an area defined by a button displayed on the operator control unit. A presence of the input means can be detected if the input means are located in front of the operator control unit (regardless of a specific button) in the distance range defined above. In this manner, a general presence of the input means within the hovering area can be signaled, as can the presence within a hovering area of a displayed button. For the audio output, of course, different signals, in particular different frequencies, can be used depending on the respective hovering area to facilitate orientation for the user. The audio output can also comprise speech output, by means of which information displayed on the operator control unit or information related to it can be made audible.

The process can further include a detection of a crossover of the input means from the first area into a predefined second area in front of the operator control unit. In other words, it is not necessary for the audio output to have the input means located before the presence inside the first predefined area outside the housing area of the operator control unit according to the invention. A predefined first audio output therefore acknowledges the detected presence alternatively or additionally as an acknowledgment of a detected crossover in the form of a predefined second audio output. The second audio output can be different from the first audio output or can be identical to it. Depending on the application, therefore, the information content of the audio output can be increased, or for purposes of simplicity a single acknowledgment tone can be provided.

Preferably, a predefined pattern of movement of the input means in the first area can be detected and in response to it, the predefined pattern of movement can be acknowledged by a third audio output associated with the predefined pattern of movement. The predefined pattern of movement can be, for example, a tapping motion, a zoom motion (spreading of the fingers), a wiping motion, etc., all of which can be predefined and recognized. If corresponding audio outputs are associated with the predefined patterns of movement, the user can determine without looking at the operator control unit that the pattern of movement has been correctly detected. In this manner an visual verification of the control operation becomes unnecessary, as a result of which the driver can devote more of his attention to driving the vehicle.

Depending on the operator control operation, and depending on the button displayed on the operator control unit in front of which hovering is detected, different audio outputs, e.g. from one of the signal classes listed below, can be provided. A clicking sound of a first (higher) frequency, a clicking sound of a second (lower) frequency or a particular peep sound can be used to acknowledge a presence of the input means in front of the operator control unit in general or in front of a specific button displayed on it. Alternatively or additionally, the arrival of the input means in the hovering area can be acknowledged by an audio signal at a higher frequency and the departure from the hovering area by an audio signal at a lower frequency. Furthermore, for example, depending on a function associated with the button, a sound of thunder (as an acoustical representation of stormy weather), a sound of rain (as an acoustical representation of heavy rainfall) or a sound of wind (as an acoustical representation of high wind without precipitation) can be reproduced as soon as the input means are hovering over an button for the output of weather information. Correspondingly, when a button for a telephony function is reached, a DTMF sequence of tones or a dial tone can be output to inform the user of the telephony function reached. Alternatively, a media-related speech output can be generated by means of which, for example, the title of the music currently being played or paused can be spoken. With regard to a navigation function, a current distance from the destination or similar information can be spoken. In the context of a monitoring of the vehicle data, for example, the level of the energy storage unit (or "tank") can be output as speech. A context-based audio output thereby makes it possible to reproduce information without the user having to take his eyes off the road. This increases road safety during the interaction with a vehicle-based control unit.

In addition to the acknowledgment by a predefined associated audio output, the detected presence can be acknowledged by a predefined alternative optical illustration of a button displayed on the screen. By visual feedback (e.g. by the flashing of a frame around the button in question, by an inversion of the colors of the button or a similar process), the association between the audio output and the operator control interaction can be reinforced, even in the presence of a high noise level.

In certain illustrative embodiments, a user interface can be configured, for example, in the form of a man-machine interface (HMI, Human Machine Interface) permanently built into a motor vehicle. HMIs are generally display units located relatively centrally in the dashboard of an automobile and are frequently in the form of touch-sensitive control units. The user interface according to the invention comprises, in addition to a touch-sensitive control unit of this type, a detection device for the detection of a user input (or the presence of an input means in a predefined first area in front of the operator control unit) and a processing device. These components enable the user interface according to the present disclosure to carry out a process of the type described herein and result in similar features, combinations of features and the resulting advantages.

The detection device of the user interface is preferably equipped with a camera system and/or a capacitive sensor by means of which the presence of the input means in the predefined first area in front of the operator control unit can be detected.

FIG. 1 shows a vehicle 8 that includes a display of a HMI incorporated into the dashboard in the form of the operator control unit 1. A camera 6 is provided in one example as a detection device in the vicinity of the windshield. The camera 6, as an example of a suitable (contactless) sensor system for the detection of the distance between the operator's control unit 1 and input means, is connected by a data link with an electronic control unit 7 as a processing device. The electronic control unit 7 is further connected with a loudspeaker 9 for the generation of an audio output and with the operator control unit 1, on the screen of which a first button 10 and a second button 20 are displayed. At a respective distance a from the buttons 10, 20 are respective rectangular areas 11, 21, shown in broken lines, in which a presence of input means is detected as hovering. The areas 11, 21 are bounded by a first surface 12 or 22 respectively oriented parallel to the surface of the operator control unit 1, a second surface 13 or 23 respectively oriented parallel to the surface of the operator control unit 1 and further from the surface, and by four surfaces 14 or 24 respectively, 15 or 25 respectively, 16 or 26 respectively and 17 or 27 respectively, so that the buttons 10, 20 represent perpendicular projections of the areas 11, 21 on the operator's control unit 1 or are bounded by them.

Figure 2:
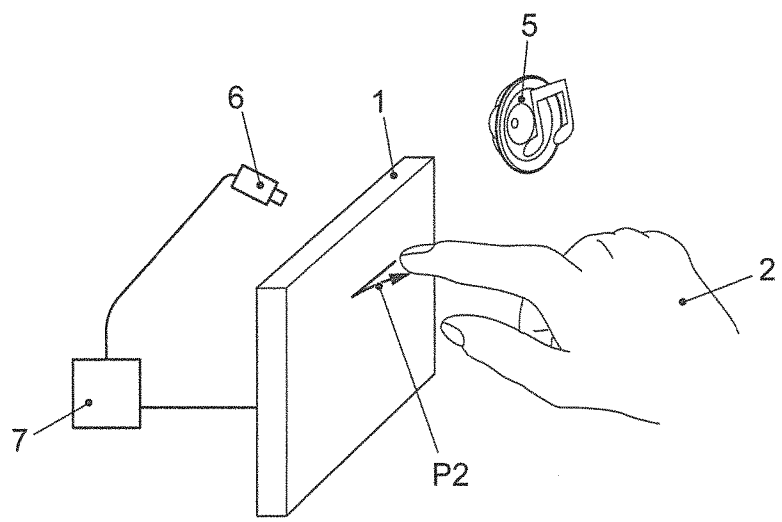
FIG. 2 is a diagram of a detectable predefined movement pattern according to an illustrative embodiment.

FIG. 2 shows a control process that is performed by the hand of a user 2 in front of an operator control unit 1. The hand or the finger executes the motion indicated by the arrow P2 without touching the operator control unit 1. The arrow can be described as an approximation, in connection with a subsequent distancing of the finger from the operator's control unit, which can be described as a tapping gesture. This tapping gesture is executed within the predefined first area (not shown in FIG. 2) and is detected by the camera 6. In response to it, the electronic control unit 7 triggers a corresponding function and modification of the display on the operator's control unit 1. According to the invention, a signal associated with the function is also generated in the form of an audio output 5, namely an acoustic representation ("earcon") for the launched function, that informs the user of the successful input.

Figure 3:
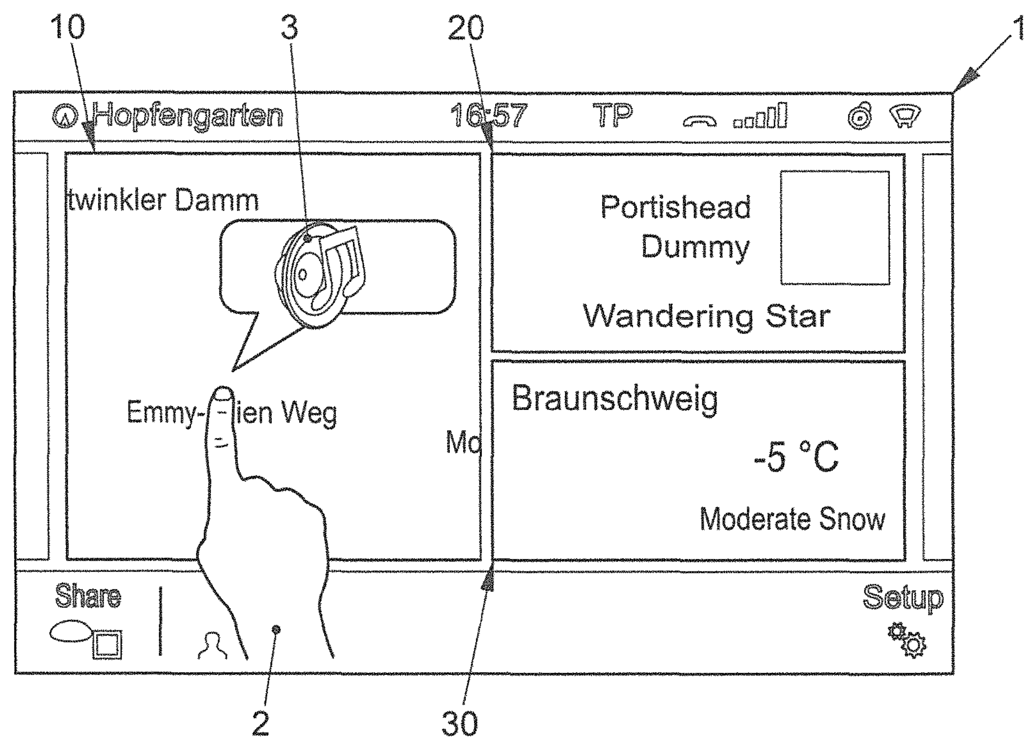
FIG. 3 is an illustration of operating steps of a user interface according to an illustrative embodiment.

FIG. 3 shows a possible user interface that can be displayed on the operator control unit 1. On a first button 10, an excerpt of a map can be displayed that corresponds to a portion of a route calculated by a navigation system. On the right side of the display, in an upper area, a second button 20 is displayed, by means of which a title of a selection currently being played, the name of the performer(s) and the album that contains the selection are displayed. Below the second button 20 is a third button 30, in which the weather in the city of Braunschweig is displayed in the form of an button in connection with the temperature in degrees Celsius and the current precipitation situation. The hand of a user 2 is in front of the first button 10. The presence of the hand is acknowledged by means of a first predefined audio output 3.

Figure 4:
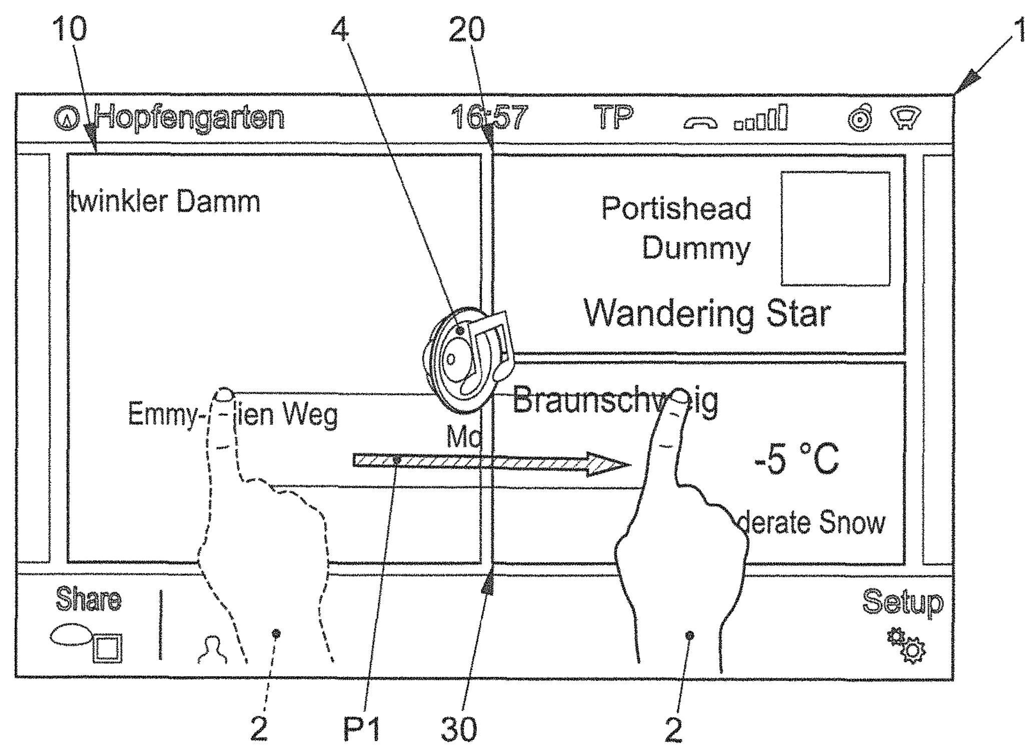
FIG. 4 is an illustration of an alternative operating step of a user interface according to an illustrative embodiment.

FIG. 4 shows a view in connection with FIG. 3 of what happens when the user's hand 2 executes an alternative gesture. The hand thereby moves from a first area 11 in front of the first button 10 into a third area in front of the third button 30. The detected crossover is acknowledged by a predefined second audio output 4. To assist the user, the second audio output 4 corresponds with the content of the third button, by playing an audio file that simulates the sound of falling snow. For example, a soft, high-frequently glockenspiel can create a corresponding association in the mind of the user 2.

Figure 5:
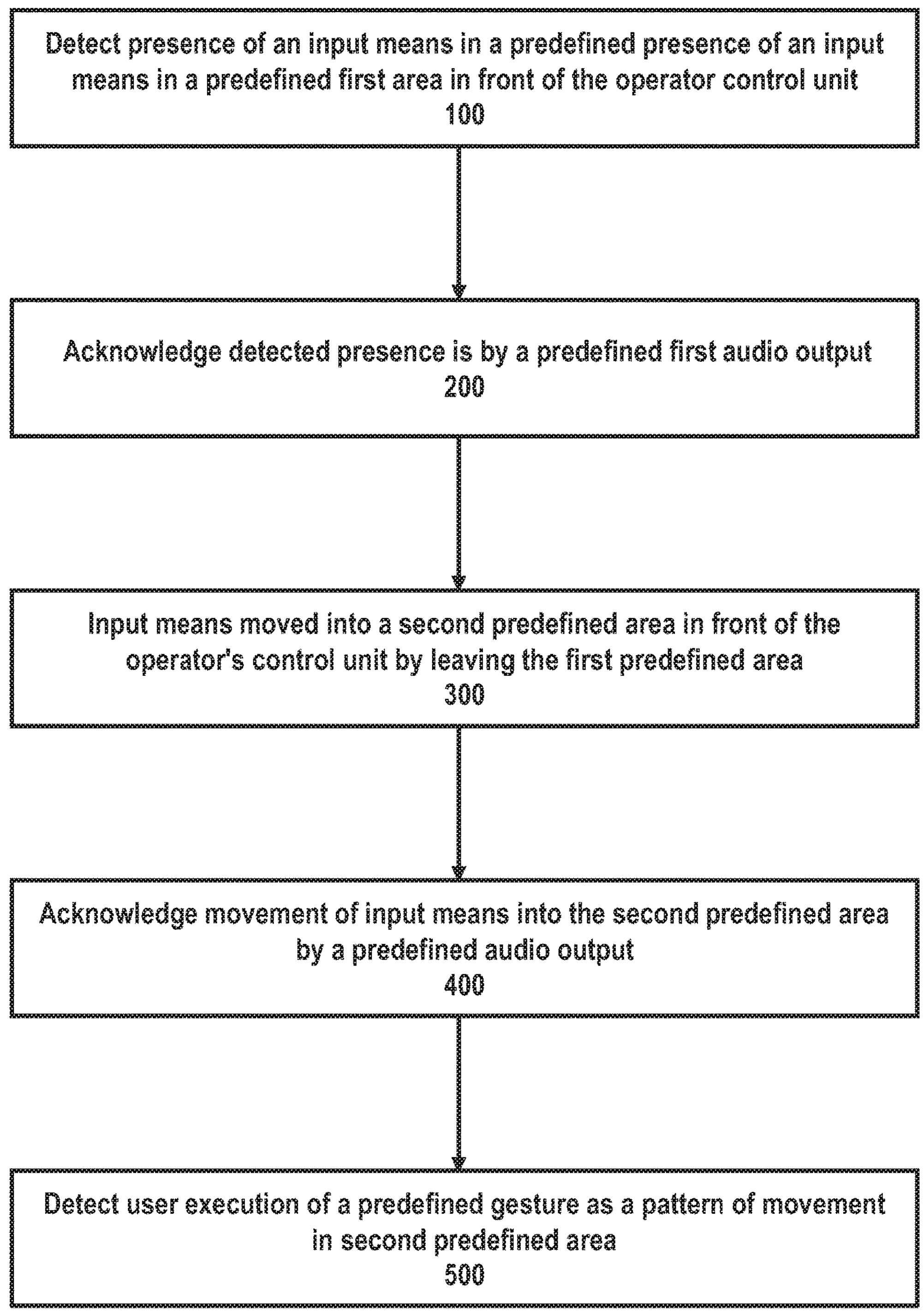
FIG. 5 is a flow diagram that illustrates operational steps of a process according to an illustrative embodiment.

FIG. 5 is a flow diagram that illustrates the steps in the process of one exemplary embodiment of a process according to the invention. In step 100, the presence of an input means in a predefined first area in front of the operator control unit is detected. In response to that, in step 200 the detected presence is acknowledged by a predefined first audio output. In step 300, the input means move into a second predefined area in front of the operator's control unit by leaving the first predefined area. This is acknowledged in step 400 by a predefined second audio output. When the input means arrive in the second area in front of the operator's control unit, the user executes a predefined gesture as a pattern of movement which is detected in step 500 by the user interface according to the invention. To assist the user in the operation of the user interface according to the invention, the predefined pattern of movement is also acknowledged by an associated third audio output.

In the description above, for the purposes of explanation, numerous specific details have been set forth in order to provide a thorough understanding of the embodiments. It will be apparent however, to one skilled in the art, that one or more other embodiments may be practiced without some of these specific details. The particular embodiments described are not provided to limit the invention but to illustrate it. The scope of the invention is not to be determined by the specific examples provided above but only by the claims below. In other instances, well-known structures, devices, and operations have been shown in block diagram form or without detail in order to avoid obscuring the understanding of the description. Where considered appropriate, reference numerals or terminal portions of reference numerals have been repeated among the figures to indicate corresponding or analogous elements, which may optionally have similar characteristics.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

LIST OF REFERENCE NUMERALS

1 Operator control unit
2 User input means
3, 4, 5 Audio outputs
6 Camera
7 Electronic control unit
8 Vehicle
10 Button
11 First area
12, 13, 14, 15, 16, 17 Area limits
20 Button
21 Second area
22, 23, 24, 25, 26, 27 Area limits
100, 200, 300, 400, 500, 600 Process steps
P1, P2 Gestures
a Distance

The invention claimed is:

1. A processor-based method of operating a touch-sensitive operator control unit configured to execute functions for a vehicle, comprising:

displaying a graphical symbol on the operator control unit;

detecting, via a sensor system, the presence of input means in a predefined first area in front of the operator control unit in an area of the displayed graphical symbol, wherein the predefined first area comprises an area parallel to a surface of the operator control unit;

acknowledging, via a processing apparatus, the detected presence of the input means by generating a predefined first audio output;

detecting, via the sensor system, a crossover of the input means from the first area to a predefined second area in front of the operator's control unit, the second area being associated with executing a function for the vehicle;

acknowledging, via the processing apparatus, the detected crossover by a generating predefined second audio output;

detecting, via the sensor system, a predefined pattern of movement of the input means in the predefined second area;

acknowledging, via the processing apparatus, the predefined pattern of movement by a third audio output associated with the predefined pattern of movement; and executing the function for the vehicle based on the detected predefined pattern of movement.

2. The method of claim 1, wherein the predefined first area comprises a distance from the operator control unit that is greater than 0 mm.

3. The method of claim 1, wherein the predefined first area comprises a distance from the operator control unit that is greater than 1 mm.

4. The method of claim 1, wherein the predefined first area comprises a distance from the operator control unit that is greater than 2 mm.

5. The method of claim 1, wherein generating a predefined first audio output comprises a signal that corresponds to the displayed graphical symbol on the operator's control unit.

6. The method of claim 1, wherein the generated audio output comprises at least one of:

a click sound at a first frequency, a click sound at a second frequency lower than the first frequency, a peep sound, the sound of thunder, the sound of rainfall, the sound of wind, a sequence of DTMF tones (touch tones), a dial tone, and speech outputs.

7. The method of claim 1, wherein the acknowledging of the detected presence of the input means comprises displaying another graphical symbol on the operator control unit.

8. A Human Machine Interface installed in a motor vehicle, comprising:

a touch-sensitive operator control unit configured to display a graphical symbol on the operator control unit;

a detection device configured to detect the presence of input means; and a processing device, operatively coupled to the detection device and the operator control unit, wherein the processing device is configured to:

detect the presence of the input means in a predefined first area in front of the operator control unit in an area of the displayed graphical symbol, wherein the predefined first area comprises an area parallel to a surface of the operator control unit;

acknowledge the detected presence of the input means by generating a predefined first audio output;

detect a crossover of the input means from the first area to a predefined second area in front of the operator's control unit, the second area being associated with executing a function for the vehicle;

acknowledge the detected crossover by a generating predefined second audio output;

detect a predefined pattern of movement of the input means in the predefined second area;

acknowledge the predefined pattern of movement by a third audio output associated with the predefined pattern of movement; and execute function for the vehicle based on the detected predefined pattern of movement.

9. The Human Machine Interface of claim 8, wherein the operator's control unit is located centrally in the dashboard of the motor vehicle.

10. The Human Machine Interface of claim 8, wherein the detection device comprises a camera system and/or a capacitive sensor.

11. The Human Machine Interface of claim 8, wherein the predefined first area comprises a distance from the operator control unit that is greater than 0 mm.

12. The Human Machine Interface of claim 8, wherein the predefined first area comprises a distance from the operator control unit that is greater than 1 mm.

13. The Human Machine Interface of claim 8, wherein the predefined first area comprises a distance from the operator control unit that is greater than 2 mm.

14. The Human Machine Interface of claim 8, wherein the processing device is configured to generate a predefined first audio output by generating a signal that corresponds to the displayed graphical symbol on the operator's control unit.

15. The Human Machine Interface of claim 8, wherein the generated audio output comprises at least one of:

a click sound at a first frequency, a click sound at a second frequency lower than the first frequency, a peep sound, the sound of thunder, the sound of rainfall, the sound of wind, a sequence of DTMF tones (touch tones), a dial tone, and speech outputs.

16. The Human Machine Interface of claim 8, wherein the processing device is configured to acknowledge the detected presence of the input means by generating and displaying another graphical symbol on the operator control unit.

* * * * *